United States Patent
Okoshi et al.

(10) Patent No.: US 8,703,010 B2
(45) Date of Patent: Apr. 22, 2014

(54) CURING AGENT FOR EPOXY RESINS AND EPOXY RESIN COMPOSITIONS

(75) Inventors: Atsushi Okoshi, Okayama (JP); Ryuji Ideno, Kanagawa (JP); Takao Ota, Tokyo (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 1839 days.

(21) Appl. No.: 11/629,187

(22) PCT Filed: May 17, 2005

(86) PCT No.: PCT/JP2005/008952
§ 371 (c)(1),
(2), (4) Date: Dec. 11, 2006

(87) PCT Pub. No.: WO2005/121202
PCT Pub. Date: Dec. 22, 2005

(65) Prior Publication Data
US 2008/0306223 A1      Dec. 11, 2008

(30) Foreign Application Priority Data
Jun. 10, 2004   (JP) .................................. 2004-172751
Dec. 22, 2004   (JP) .................................. 2004-371439

(51) Int. Cl.
C09K 3/00      (2006.01)
C08G 59/14     (2006.01)

(52) U.S. Cl.
USPC ..................................... 252/182.28; 525/533

(58) Field of Classification Search
USPC ..................................... 525/533; 252/182.28
See application file for complete search history.

(56) References Cited

U.S. PATENT DOCUMENTS

| | | | | |
|---|---|---|---|---|
| 4,198,340 | A * | 4/1980 | Ariga et al. | 549/240 |
| 5,399,608 | A * | 3/1995 | Allen et al. | 524/413 |
| 5,412,108 | A * | 5/1995 | Fisher | 549/245 |
| 6,432,484 | B1 * | 8/2002 | Corcoran et al. | 427/385.5 |
| 7,569,708 | B2 * | 8/2009 | Okoshi | 549/245 |
| 2002/0136968 | A1 * | 9/2002 | Takebe | 430/7 |
| 2004/0266980 | A1 * | 12/2004 | Ideno et al. | 528/365 |
| 2007/0123716 | A1 * | 5/2007 | Okoshi | 549/245 |

FOREIGN PATENT DOCUMENTS

| | | |
|---|---|---|
| EP | 1493766 | 1/2005 |
| JP | 05-078453 | 3/1993 |
| JP | 2000-143772 | 5/2000 |
| JP | 2000-344868 | 12/2000 |
| JP | 2001-114868 | 4/2001 |
| JP | 2002-097251 | 4/2002 |
| JP | 2003-26763 | 1/2003 |
| JP | 2004-203792 | 7/2004 |
| JP | 2005-036218 | 2/2005 |

OTHER PUBLICATIONS

Supplementary European Search Report dated Jan. 13, 2009, for Application No. EP 05 74 1639.

* cited by examiner

*Primary Examiner* — Mark Eashoo
*Assistant Examiner* — Megan McCulley
(74) *Attorney, Agent, or Firm* — Antonelli, Terry, Stout & Kraus, LLP.

(57) ABSTRACT

A curing agent for epoxy resins which comprises cyclohexanetricarboxylic acid anhydride (A) comprising trans,trans-1,2,4-cyclohexanetricarboxylic acid 1,2-anhydride expressed by formula (1) and aliphatic dicarboxylic acid anhydride (B) and an epoxy resin composition which comprises the curing agent and an epoxy resin are provided. The curing agent of the present invention can be handled easily since the curing agent is liquid at the ordinary temperature, exhibits an excellent curing property without addition of a curing accelerator and provides a cured product of an epoxy resin exhibiting excellent transmission of light and heat stability. The epoxy resin composition can be advantageously used for coating materials, adhesives, molded products, resins for encapsulating photo-semiconductors and coating fluids for protective films of color filters constituting liquid crystal display devices (LCD), solid state imaging devices (CCD) and electroluminescence (EL) devices.

(1)

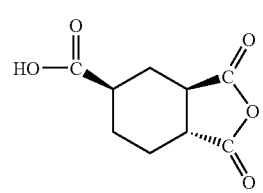

11 Claims, No Drawings

CURING AGENT FOR EPOXY RESINS AND EPOXY RESIN COMPOSITIONS

TECHNICAL FIELD

The present invention relates to a novel curing agent for epoxy resins and an epoxy resin composition. More particularly, the present invention relates to a curing agent for epoxy resins which can be handled easily since the curing agent is liquid and exhibits an excellent curing property without addition of a curing accelerator and an epoxy resin composition comprising the curing agent for epoxy resins.

BACKGROUND ART

Recently, blue LED and white LED exhibiting great luminance have been developed, and the application is expanding into areas such as backlights of bulletin boards, full color displays and portable telephones. As the encapsulating material for photoelectric conversion devices such as LED, epoxy resin compositions comprising a compound having epoxy group and a curing agent of an acid anhydride have heretofore been used since the epoxy resin composition exhibits an excellent colorless and transparent property.

As the curing agent for compounds having epoxy resin used for photoelectric conversion devices, alicyclic dicarboxylic acid anhydrides such as methylhexahydrophthalic acid anhydride, norbornanedicarboxylic acid anhydride, methyltetrahydrophthalic acid anhydride, hexahydrophthalic acid anhydride and tetrahydrophthalic acid anhydride are widely used (Patent References 1 to 4). Among these agents, methylhexahydrophthalic acid anhydride and methyltetrahydrophthalic acid anhydride which are liquid at the ordinary temperature are mainly used due to easy handling.

However, when the above alicyclic dicarboxylic acid anhydride is used as the curing agent, it is necessary that a curing accelerator be added to achieve sufficient curing due to the small reactivity of curing.

As the curing accelerator, quaternary phosphonium salts, tertiary amines, imidazoles, organic hydrazides and diazabicycloalkenes are used. However, these curing accelerators have drawbacks in that the curing accelerators are very expensive, the method of the use is complicated, and deterioration in color tone and decrease in the strength arise when the curing accelerators are used in a great amount.

Patent Reference 1: Japanese Patent Application Laid-Open No. 2000-344868
Patent Reference 2: Japanese Patent Application Laid-Open No. 2001-114868
Patent Reference 3: Japanese Patent Application Laid-Open No. 2002-97251
Patent Reference 4: Japanese Patent Application Laid-Open No. 2003-26763

DISCLOSURE OF THE INVENTION

The present invention has an object of providing a curing agent for epoxy resins which can be handled easily since the curing agent is liquid at the ordinary temperature, exhibits an excellent curing property without addition of a curing accelerator and provides a cured product of an epoxy resin exhibiting excellent transmittance of light and heat stability.

As the result of intensive studies by the present inventors to achieve the above object, it was found that a curing agent which could be handled easily and was a homogeneous liquid could be obtained by mixing a cyclohexanetricarboxylic acid comprising 1,2,4-cyclohexanetricarboxylic acid having a specific steric structure with an aliphatic dicarboxylic acid anhydride, that the curing of an epoxy resin could be achieved without using a curing accelerator when the curing agent was used and that a cured product of an epoxy resin exhibiting excellent transmittance of light and heat stability could be obtained. The present invention has been completed based on the knowledge.

The present invention provides curing agents for epoxy resins and epoxy resin compositions described in [1] to [8] in the following.

[1] A curing agent for epoxy resins which comprises cyclohexanetricarboxylic acid anhydride (A) comprising trans,trans-1,2,4-cyclohexanetricarboxylic acid 1,2-anhydride expressed by formula (1):

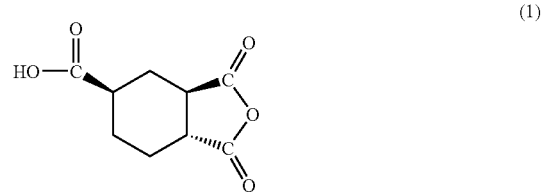 [SMILES: O=C(O)[C@@H]1CC[C@H]2C(=O)OC(=O)[C@@H]2C1]

and aliphatic dicarboxylic acid anhydride (B).

[2] A curing agent for epoxy resins described in [1], which is a mixture of cyclohexanetricarboxylic acid anhydride (A) which comprises trans,trans-1,2,4-cyclohexanetricarboxylic acid 1,2-anhydride expressed by formula (1) and is liquid at an ordinary temperature and aliphatic dicarboxylic acid anhydride (B).

[3] A curing agent for epoxy resins described in [2], wherein a ratio of amounts by mass (A:B) of cyclohexanetricarboxylic acid anhydride (A) to aliphatic dicarboxylic acid anhydride (B) is in a range of 99:1 to 5:95.

[4] A curing agent for epoxy resins described in [3], wherein a ratio of amounts by mass (A:B) of cyclohexanetricarboxylic acid anhydride (A) to aliphatic dicarboxylic acid anhydride (B) is in a range of 95:5 to 10:90.

[5] A curing agent for epoxy resins described in [4], wherein a ratio of amounts by mass (A:B) of cyclohexanetricarboxylic acid anhydride (A) to aliphatic dicarboxylic acid anhydride (B) is in a range of 90:10 to 20:80.

[6] A curing agent for epoxy resins described in any one of [1] to [5], wherein aliphatic dicarboxylic acid anhydride (B) is an alicyclic dicarboxylic acid anhydride.

[7] An epoxy resin composition which comprises a curing agent for epoxy resins described in any one of [1] to [5] and an epoxy resin.

[8] An epoxy resin composition described in [7], wherein relative amounts of the epoxy resin and the curing agent for epoxy resins satisfy a condition such that a ratio of amounts by equivalent expressed by the following equation:

ratio of amounts by equivalent=$(X/2)/Y$ wherein X represents a number of an entire carboxyl group in the curing agent for epoxy resins and in the epoxy resin when a number of carboxyl group is set at 2 for one acid anhydride group and a number of carboxyl group is set at 1 for one carboxylic acid group, and Y represents a number of epoxy group in the epoxy resin, is in a range of 0.1 to 3.0.

THE MOST PREFERRED EMBODIMENT TO CARRY OUT THE INVENTION

The curing agent for epoxy resins of the present invention comprises cyclohexanetricarboxylic acid anhydride (A) comprising trans,trans-1,2,4-cyclohexanetricarboxylic acid 1,2-anhydride expressed by formula (1) and aliphatic dicarboxylic acid anhydride (B).

Examples of the cyclohexanetricarboxylic acid include cyclohexane-1,2,4-tricarboxylic acid, cyclohexane-1,3,5-tricarboxylic acid and cyclohexane-1,2,3-tricarboxylic acid. The cyclohexanetricarboxylic acid can be synthesized, for example, hydrogenation of a benzenetricarboxylic acid such as trimellitic acid.

Examples of the cyclohexanetricarboxylic acid anhydride include 1,2,4-cyclohexanetricarboxylic acid 1,2-anhydride and 1,2,3-cyclohexanetricarboxylic acid 1,2-anhydride. A combination of these acid anhydrides may be used in the present invention. 1,2,4-Cyclohexanetricarboxylic acid 1,2-anhydride is preferable.

1,2,4-Cyclohexanetricarboxylic acid 1,2-anhydride can be obtained by forming an anhydride (dehydration) of 1,2,4-cyclohexanetricarboxylic acid prepared in accordance with a process such as the direct hydrogenation of benzene-1,2,4-tricarboxylic acid, the hydrogenation of an ester of benzene-1,2,4-tricarboxylic acid and the hydrogenation of an alkali metal salt of benzene-1,2,4-tricarboxylic acid. In general, a dehydrating agent such as acetic anhydride is used for the preparation. The acid anhydride prepared by using the dehydrating agent is cis,cis-cyclohexanetricarboxylic acid 1,2-anhydride expressed by formula (2):

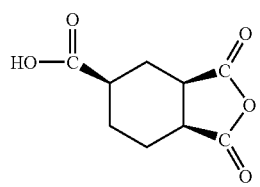

(2)

which is solid.

The cyclohexanetricarboxylic acid anhydride in the curing agent for epoxy resins of the present invention comprises the trans,trans-cyclohexanetricarboxylic acid anhydride expressed by the above formula (1). As described above, the cyclohexanetricarboxylic acid anhydride expressed by formula (2) which is prepared using a dehydrating agent is a solid substance. In contrast, the cyclohexanetricarboxylic acid anhydride expressed by formula (1) is liquid at the ordinary temperature. By mixing the cyclohexanetricarboxylic acid expressed by formula (1) into a solid cyclohexanetricarboxylic acid anhydride, the obtained mixture is provided with fluidity, and the curing agent for epoxy resins which is liquid and can be handled easily can be obtained.

The curing agent for epoxy resins of the present invention may comprise other cyclohexanetricarboxylic acid anhydrides such as cis,cis-1,2,4-cyclohexanetricarboxylic acid 1,2-anhydride expressed by formula (2) in combination with trans,trans-1,2,4-cyclohexanetricarboxylic acid 1,2-anhydride expressed by formula (1). Since trans,trans-1,2,4-cyclohexanetricarboxylic acid 1,2-anhydride and the mixture of trans,trans-1,2,4-cyclohexanetricarboxylic acid 1,2-anhydride with a cyclohexanetricarboxylic acid anhydrides such as cis,cis-1,2,4-cyclohexanetricarboxylic acid 1,2-anhydride is a cyclohexanetricarboxylic acid anhydride which is liquid at the ordinary temperature (the compound and the mixture will be referred to as the "liquid cyclohexanetricarboxylic acid anhydride", occasionally), mixing with an aliphatic dicarboxylic acid anhydride is facilitated.

The content of trans,trans-1,2,4-cyclohexanetricarboxylic acid 1,2-anhydride expressed by formula (1) in the cyclohexanetricarboxylic acid anhydride is preferably 1% by mass or greater, more preferably 5% by mass or greater and most preferably 10% by mass or greater. When the cyclohexanetricarboxylic acid anhydride comprises 1% by mass or greater of trans,trans-1,2,4-cyclohexanetricarboxylic acid 1,2-anhydride expressed by formula (1), the cyclohexanetricarboxylic acid anhydride is provided with fluidity and can be mixed with an aliphatic dicarboxylic acid anhydride in a desired relative amount, and the handling is facilitated.

trans,trans-1,2,4-Cyclohexanetricarboxylic acid 1,2-anhydride can be prepared by melting cyclohexane-1,2,4-tricarboxylic acid or cis,cis-1,2,4-cyclohexanetricarboxylic acid 1,2-anhydride by heating. Therefore, as the cyclohexanetricarboxylic acid anhydride used in the curing agent for epoxy resins of the present invention, trans,trans-1,2,4-cyclohexanetricarboxylic acid 1,2-anhydride may be used singly or as a mixture obtained by melting cyclohexanetricarboxylic acid and cis,cis-1,2,4-cyclohexanetricarboxylic acid 1,2-anhydride by heating. As the curing agent for epoxy resins of the present invention, a product obtained by mixing cyclohexane-1,2,4-tricarboxylic acid or cis,cis-1,2,4-cyclohexanetricarboxylic acid 1,2-anhydride with an aliphatic dicarboxylic acid anhydride in advance, followed by melting the resultant mixture by heating to form trans,trans-1,2,4-cyclohexanetricarboxylic acid 1,2-anhydride, may be used.

trans,trans-1,2,4-Cyclohexanetricarboxylic acid 1,2-anhydride is formed since dehydration and isomerization proceed by melting cyclohexane-1,2,4-tricarboxylic acid by heating, and isomerization proceeds by melting cis,cis-1,2,4-cyclohexanetricarboxylic acid 1,2-anhydride by heating. In general, the above reaction provides a mixture of trans,trans-1,2,4-cyclohexanetricarboxylic acid 1,2-anhydride with cis,cis-1,2,4-cyclohexanetricarboxylic acid 1,2,-anhydride.

The pressure for melting by heating may be any of the atmospheric pressure, a reduced pressure and an added pressure. The atmospheric pressure and a reduced pressure are preferable due to the easiness of removal of water formed by the dehydration.

The temperature is not particularly limited as long as the raw materials are melted. A temperature in the range of 180 to 300° C. is preferable, and a temperature in the range of 190 to 280° C. is more preferable since the rates of the dehydration and the isomerization are small at lower temperatures, and side reactions such as decarboxylation tends to take place at higher temperatures.

The time of melting by heating is different depending on the temperature. The time is preferably 24 hours or shorter and more preferably 10 hours or shorter from the standpoint of the efficiency of production. The melting by heating may be conducted in accordance with any of a batch process and a continuous process.

As the aliphatic dicarboxylic acid anhydride used in the present invention, anhydrides of linear aliphatic dicarboxylic acids (including compounds substituted with alkyl groups) such as oxalic anhydride, malonic anhydride, succinic anhydride and glutaric anhydride can be used. Among these aliphatic dicarboxylic acid anhydrides, alicyclic dicarboxylic acid anhydrides are preferable. Methylhexahydrophthalic anhydride, methylteterahydrophthalic anhydride and hydrogenated methylnadic anhydride which are liquid at the ordinary temperature are more preferable. Hexahydrophthalic anhydride which is solid at the ordinary temperature but is dissolved easily to provide a liquid mixture on mixing with a liquid cyclohexanetricarboxylic acid is also advantageously used.

For preparation of the curing agent for epoxy resins of the present invention by mixing cyclohexanetricarboxylic acid (A) comprising trans,trans-1,2,4-cyclohexanetricarboxylic acid 1,2-anhydride expressed by formula (1) with aliphatic dicarboxylic acid anhydride (B), a conventional process of mixing can be used.

The ratio of the amount by mass of cyclohexanetricarboxylic acid anhydride (A) to the amount by mass of aliphatic dicarboxylic acid anhydride (B) (A:B) in the curing agent for epoxy resins of the present invention is preferably 99:1 to 5:95, more preferably 95:5 to 10:90 and most preferably 90:10 to 20:80. When the amount of cyclohexanetricarboxylic acid anhydride (A) is 5% by mass or more, the rate of curing is increased, and curing of an epoxy resin is made possible without using curing accelerators. A cured product exhibiting excellent transmittance of light and heat stability can be obtained. When the amount of cyclohexanetricarboxylic acid anhydride (A) is 99% by mass or less, formation of crystals is suppressed, and handling of the curing agent for epoxy resins is facilitated.

Examples of the epoxy resin which can be cured with the curing agent for epoxy resins of the present invention include epoxy resins of the bisphenol A-type, epoxy resins of the bisphenol F type, epoxy resins of the cresol novolak type, epoxy resins of the phenol novolak type, epoxy resins of the biphenyl type, epoxy resins of the stilbene type, epoxy resins of the hydroquinone type, epoxy resins having the naphthalene skeleton structure, epoxy resins of the tetraphenylolethane type, epoxy resins of the DPP type, epoxy resins of the trishydroxyphenylmethane type, epoxy resins of the dicyclopentadiene phenol type, aliphatic epoxy resins such as 3,4-epoxycyclohexylmethyl-3',4'-epoxycyclohexanecarboxylate and vinyl-cyclohexene diepoxide, epoxy resins having silicon atom such as triglycidoxyphenylsilane (TGPS) and 3-glycidoxypropyltrimethoxysilane, diglycidyl ether of ethylene oxide adducts of bisphenol A, diglycidyl ether of propylene oxide adducts of bisphenol A, cyclohexanedimethanol diglycidyl ether, polyglycidyl ethers of aliphatic polyhydric alcohols, polyglycidyl esters of polybasic acids such as diglycidyl ester of hexahydrophthalic anhydride, and glycidyl ethers having one epoxy group such as alkyl glycidyl ethers, examples of which include butyl glycidyl ether and lauryl glycidyl ether, phenyl glycidyl ether and cresyl glycidyl ether. Further examples include products of hydrogenation of nuclei of the above epoxy resins. The above epoxy resin may be used singly or as a suitable mixture of two or more. Aliphatic epoxy resins and products of hydrogenation of nuclei of the epoxy resins are preferable since the colorless and transparent property of the cured product is improved.

The relative amounts of the epoxy resin and the curing agent for epoxy resins in the epoxy resin composition of the present invention are not particularly limited as long as the desired effect can be obtained. It is preferable that relative amounts of the epoxy resin and the curing agent for epoxy resins satisfy a condition such that the ratio of amounts by equivalent expressed by the following equation:

ratio of amounts by equivalent=$(X/2)/Y$ is in a range of 0.1 to 3.0 and preferably in the range of 0.3 to 1.5. In the above equation, X represents the number of the entire carboxyl group in the curing agent for epoxy resins and in the epoxy resin when the number of carboxyl group is set at 2 for one acid anhydride group and the number of carboxyl group is set at 1 for one carboxylic acid group, and Y represents the number of epoxy group in the epoxy resin. When the above ratio of the amounts by equivalent is 0.1 or greater, the progress of the curing is sufficiently achieved. When the above ratio of the amounts by equivalent is 3.0 or smaller, decrease in the glass transition temperature (Tg) and deterioration in the moisture absorption and the colorless and transparent property are prevented, and coloring under a condition of high temperatures and under irradiation with light having a great energy can be prevented. Therefore, the ratio of the amounts by equivalent in the above range is preferable. The number of the entire carboxyl group is obtained in accordance with the neutralizing titration. The number of epoxy group is calculated from the epoxy equivalent of the epoxy resin.

In the epoxy resin composition of the present invention, in general, the use of a curing accelerator is not necessary since the colorless and transparent property of the cured product tends to be deteriorated by the use of the curing accelerator. However, a curing accelerator may be suitably used where necessary as long as the effect of the present invention is not adversely affected.

Examples of the curing accelerator which is used where necessary include tertiary amines such as benzyldimethylamine, tris(dimethylaminomethyl)phenol and dimethylcyclohexylamine; imidazoles such as 1-cyanoethyl-2-ethyl-4-methylimidazole, 2-ethyl-4-methylimidazole and 1-benzyl-2-methylimidazole; organic phosphorus compounds such as triphenylphosphine and triphenyl phosphite; quaternary phosphonium salts such as tetraphenylphosphonium bromide and tetra-n-butyl-phosphonium bromide; diazabicycloalkenes of salts of organic acids such as 1,8-diazabicyclo[5,4,0]undecene-7; organometallic compounds such as tin octylate and aluminum acetylacetone complex; quaternary ammonium salts such as tetraethylammonium bromide and tetrabutylammonium bromide; boron compounds such as boron trifluoride and triphenyl borate; and metal halides such as zinc chloride and stannic chloride. Further examples include latent accelerators, typical examples of which include latent accelerators of the high melting point and dispersion type such as accelerators of the amine addition type obtained by adding an imidazole compound, dicyandiamide or an amine having high melting point to an epoxy resin; latent accelerators of the microcapsule type obtained by coating the surface of imidazole-based accelerators, phosphorus-based accelerators and phosphine-based accelerators with a polymer; latent accelerators of the amine salt-type; and latent accelerators of the thermal cationic polymerization type which are dissociated at high temperatures such as Lewis acids and Brønsted acids. The curing accelerator may be used singly or in combination of two or more.

Where necessary, the epoxy resin composition of the present invention may comprise various additives as long as the properties of the obtained cured product are not adversely affected. Examples of the additive include agents for preventing formation of carbon dioxide gas such as aliphatic polyols, examples of which include ethylene glycol and propylene glycol, aliphatic and aromatic carboxylic acid compounds and phenol compounds; agents for providing flexibility such as polyalkylene glycols; antioxidants; plasticizers; lubricants; coupling agents such as silane-based coupling agents; agents for surface treatments of inorganic fillers; flame retardants; antistatic agents; coloring agents; antistatic agents; leveling agents; ion trapping agents; agents for improving the sliding property; agents for improving impact resistance such as various types of rubber, organic polymer beads and inorganic fillers, examples of which include glass beads and glass fibers; agents for providing thixotropy; surfactants; agents for decreasing the surface tension; defoaming agents; agents for preventing precipitation; light diffusers; ultraviolet light absorbents; antioxidants; mold releases; fluorescent agents; electrically conductive fillers.

The process for the curing is not particularly limited, and a conventional curing apparatus such as a curing oven of the closed type and a tunnel oven enabling the continuous curing can be used. The source of heat is not particularly limited, and conventional processes such as heating with the circulated heated air, heating by infrared light and high frequency heating can be used. It is preferable that the temperature and the time of the curing by heating are in the range of 80 to 250° C. and in the range of 30 seconds to 10 hours, respectively. When the decrease in the internal stress is desired, it is preferable that the pre-curing is conducted at 80 to 120° C. for 0.5 to 5 hours, and then the post-curing is conducted at 120 to 180° C. for 0.1 to 5 hours.

The epoxy resin composition of the present invention can be used in applications requiring transparency. Examples of the application include electrically insulating encapsulating materials for photoelectric converters, typical examples of which include light emitting devices such as LED and semiconductor lasers, light receiving devices such as photoconductive devices, photodiodes, solar batteries, phototransistors and photothyristors and photo-coupled devices such as photocouplers and photointerrupters; adhesives for liquid crystals; resins for rapid prototyping; surface coating agents for plastics, glasses and metals; and decorative materials. Specific examples include electrically insulating materials for heavy electric apparatuses such as mold transformers, mold transformers (current transformers (CT), zero-layer current transformers (ZCT), potential transformers (PT) and potential transformers of the installation type (ZPT)), instrument members for gas flow switches (insulation spacers, supporting insulators, operation rods, sealing terminals, bushing and insulation poles), instrument members for solid insulation switches, instrument members for automation of aerial electric lines (rotating insulators, voltage detecting elements and combined condensers), instrument members for underground wiring (mold disconnectors and power source transformers), condensers for electric power, resin insulators and coils for linear motor vehicles; and impregnation varnishes for various rotating instruments (electricity generators and motors).

The epoxy resin composition of the present invention can be applied to electric insulators and molded products having a thickness of 2 mm or greater prepared in accordance with a conventional process such as the potting process, the casting process, the filament winding process and the lamination process. Specifically, the epoxy resin composition can be used as the electrically insulating encapsulating resin used in the field of light electrical appliances such as potting resins for fly back transformers, ignition coils and AC condensers; transparent encapsulating resins for detectors, emitters and photocouplers; impregnation resins for film condensers and various types of coils. Examples of applications as laminate boards and applications which do not always require electric insulation include epoxy resin compositions for various types of FRP molded products, various types of coating materials, adhesives and decorative materials.

EXAMPLES

The present invention will be described more specifically with reference to examples in the following. However, the present invention is not limited to the examples.

Physical properties of curing agents for epoxy resins and cured products obtained in Examples and Comparative Examples were evaluated in accordance with the following methods.

(1) Viscosity of a Curing Agent for Epoxy Resins

The viscosity was measured using a viscometer of the cone plate type, Type TV-20, manufactured by TOKI SANGYO Co., Ltd.

(2) Storage Stability of a Curing Agent for Epoxy Resins

After a curing agent for epoxy resins is kept at the room temperature in a vessel purged with nitrogen gas for a long time (1 month, 2 months or 3 months), formation of crystals on the surface of the curing agent was examined and evaluated by visual observation. The result is expressed as good when no formation of crystals was found and as poor when formation of crystals was found.

(3) Light Transmittance of a Cured Product of an Epoxy Resin

The transmittance of light of 400 nm through a cured product of an epoxy resin was measured using a spectrophotometer (manufactured by SHIMADZU SEISAKUSHO Co., Ltd.; Spectrophotometer UV-3100).

The ratio (D/C) of the light transmittance (D) after the cured product was treated in the air for 24 hours at 150° C. to the initial light transmittance (C) of the cured product was used as the retention of light transmittance.

Analysis, separation and identification of the cyclohexanetricarboxylic acid anhydride used in Examples and Comparative Examples were conducted in accordance with HPLC and NMR. The conditions of the measurements were as follows:

(1) HPLC Analysis
  Apparatus: manufactured by AGILENT; HP1100(B)
  Column: YMC-Pack CN 120 Å S-5 μm
    4.6 mm×150 mm
  Moving Phase: normal-hexane/tetrahydrofuran=90/10
  Column Temperature: 40° C.
  Flow Rate: 1.0 ml/min
  Sample Solution: about 7,000 ppm acetonitrile solution
  Amount of Injection: 5 μl (2) Separation in Accordance with HPLC
  Apparatus: manufactured by SHIMADZU SEISAKUSHO Co., Ltd.; LC-6A
  Column: CAPCELL PAK CN 120 Å 5 μm
    20 mm×250 mm
  Moving Phase: normal-hexane/tetrahydrofuran=95/5
  Column Temperature: the room temperature
  Flow Rate: 10 ml/min
  Sample Solution: 8 mg/ml acetonitrile solution
  Amount of Injection: 1 ml
  Region of Separation:
    cut 1: Rt=17 to 19 minutes
    cut 2: Rt=19 minutes 30 seconds to 24 minutes
    (Rt represents the retention time)

(3) NMR Measurement

The planar structure was decided in accordance with the two-dimensional NMR analysis. The axial and equatorial protons were decided by deciding the coupling constant between the protons in accordance with the decoupling method (refer to "Yukikagobutsu no supekutoru niyoru doteiho" (Identification of organic compounds in accordance with spectroscopy)" by R. M. Silverstein and B. C. Bassler; published by TOKYO KAGAKU DOJIN), and the steric structure was estimated based on the result.
  Apparatus: manufactured by NIPPON DENSHI Co.;
    JNM-ALPHA-400 (400 MHz)
  Solvent:
    cut 1: heavy acetone, heavy DMSO (decoupling $^1$H-NMR)
    cut 2: heavy acetone
  Probe: TH5 (5 mmφ)

Method:
one-dimensional NMR: $^1$H-NMR, $^{13}$C-NMR, DEPT135,
decoupling $^1$H-NMR
two dimensional NMR: HHCOSY, HMQC, NOESY Preparation Example 1

Into a four-necked flask equipped with a thermometer, a stirrer, a condenser and a temperature controller, 100 parts by mass of cyclohexane-1,2,4-tricarboxylic acid was placed and melted by heating at 250° C. for 3 hours while formed water was removed to the outside of the system with a stream of nitrogen gas, and 1,2,4-cyclohexanetricarboxylic acid 1,2-anhydride was obtained. as a light yellow transparent liquid substance The yield of the anhydride was 95% based on the amount of cyclohexane-1,2,4-tricarboxylic acid used as the raw material. The obtained liquid 1,2,4-cyclohexanetricarboxylic acid had a viscosity of 14.6 Pa·s at 60° C.

The obtained liquid anhydride was analyzed in accordance with HPLC, and two peaks (Rt=7.5 and 8.7 minutes) were detected. The obtained liquid anhydride was subjected to separation in accordance with HPLC, and cut 1 and cut 2 corresponding to the above two peaks were obtained. As the result of the measurements of cut 1 and cut 2 in accordance with NMR, it was found that cut 1 had a planar structure expressed by formula (3) and was identified to be trans,trans-1,2,4-cyclohexanetricarboxylic acid 1,2-anhydride represented by formula (1) (refer to Tables 1 and 2). It was found that cut 2 had a planar structure expressed by formula (4) and was identified to be cis,cis-1,2,4-cyclohexanetricarboxylic acid 1,2-anhydride expressed by formula (2) (refer to Tables 3 and 4).

In the above liquid anhydride, the content of trans,trans-cyclohexanetricarboxylic acid 1,2,-anhydride was 63.2% by mass, and the content of cis,cis-1,2,4-cyclohexanetricarboxy-lic acid 1,2-anhydride was 36.8% by mass.

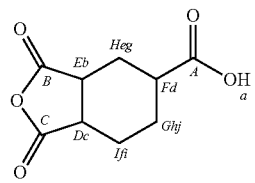

(3)

TABLE 1

| Cut 1 $^1$H-NMR | | | |
|---|---|---|---|
| Chemical shift | Shape of signal | Number of $^1$H | Mark |
| 10.87 | broad singlet | 1 | a |
| 3.68 | multiplet | 1 | b |
| 3.32 | multiplet | 1 | c |
| 2.48 | multiplet | 1 | d |
| 2.29 | multiplet | 1 | e |
| 2.15 | multiplet | 1 | f |
| 1.98 | multiplet | 2 | g, h |
| 1.64 | multiplet | 2 | i, j |

REF signal 2.05 ppm heavy acetone signal

TABLE 2

| Cut 1 $^{13}$C-NMR | | | |
|---|---|---|---|
| Chemical shift | Shape of signal | Number of $^{13}$C | Mark |
| 175.40 | singlet | 1 | A |
| 174.24 | singlet | 1 | B |
| 173.89 | singlet | 1 | C |
| 40.37 | singlet | 1 | D |
| 40.29 | singlet | 1 | E |
| 38.51 | singlet | 1 | F |
| 25.44 | singlet | 1 | G |
| 24.74 | singlet | 1 | H |
| 24.42 | singlet | 1 | I |

REF signal 29.8 ppm heavy acetone signal

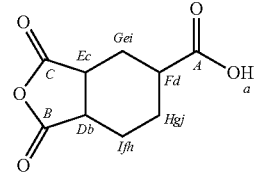

(4)

TABLE 3

| Cut 2 $^1$H-NMR | | | |
|---|---|---|---|
| Chemical shift | Shape of signal | Number of $^1$H | Mark |
| 10.78 | broad singlet | 1 | a |
| 3.57 | multiplet | 1 | b |
| 3.35 | multiplet | 1 | c |
| 2.46 | multiplet | 1 | d |
| 2.37 | multiplet | 1 | e |
| 2.22 | multiplet | 1 | f |
| 1.99 | multiplet | 1 | g |
| 1.85 | multiplet | 1 | h |
| 1.58 | multiplet | 1 | i |
| 1.42 | multiplet | 1 | j |

REF signal 2.04 ppm heavy acetone signal

TABLE 4

| Cut 2 $^{13}$C-NMR | | | |
|---|---|---|---|
| Chemical shift | Shape of signal | Number of $^{13}$C | Mark |
| 175.46 | singlet | 1 | A |
| 174.28 | singlet | 1 | B |
| 173.63 | singlet | 1 | C |
| 40.36 | singlet | 2 | D, E |
| 39.20 | singlet | 1 | F |
| 28.33 | singlet | 1 | G |
| 25.56 | singlet | 1 | H |
| 21.34 | singlet | 1 | I |

REF signal 29.8 ppm heavy acetone signal

Example 1

Into a four-necked flask equipped with a thermometer, a stirrer, a condenser and a temperature controller, 20 parts by mass of liquid 1,2,4-cyclohexanetricarboxylic acid 1,2-anhydride obtained in Preparation Example 1 and 80 parts by mass of RIKACID MH700G (the main component: methylhexahydrophthalic anhydride; manufactured by NEW JAPAN CHEMICAL Co., Ltd.) were placed. The resultant mixture was heated under stirring at 120° C. for 1 hour under a stream of nitrogen gas, curing agent for epoxy resins was prepared.

The obtained curing agent for epoxy resins in an amount of 11.6 parts by mass and 13.4 parts by mass of EPICOAT YX8000 (an epoxy resin of the bisphenol A type hydrogenated at the nuclei; the epoxy equivalent: 201; manufactured by JAPAN EPOXY RESIN Co., Ltd.) were mixed. The resultant mixture was heated at 120° C. for 2 hours and then at 150° C. for 3 hours, and a cured product having a thickness of 1 mm was obtained.

The results of evaluation of the curing agent for epoxy resins and the cured product are shown in Table 5.

Example 2

A curing agent for epoxy resins was prepared in accordance with the same procedures as those conducted in Example 1 except that 50 parts by mass of liquid 1,2,4-cyclohexanetricarboxylic acid 1,2-anhydride obtained in Preparation Example 1 and 50 parts by mass of RIKACID MH700G were used.

The obtained curing agent for epoxy resins in an amount of 40.0 parts by mass and 41.0 parts by mass of EPICOAT YX8000 were mixed, and a cured product having a thickness of 1 mm was obtained in accordance with the same procedures as those conducted in Example 1.

The results of evaluation of the curing agent for epoxy resins and the cured product are shown in Table 5.

Example 3

A curing agent for epoxy resins was prepared in accordance with the same procedures as those conducted in Example 1 except that 80 parts by mass of liquid 1,2,4-cyclohexanetricarboxylic acid 1,2-anhydride obtained in Preparation Example 1 and 20 parts by mass of RIKACID MH700G were used.

The obtained curing agent for epoxy resins in an amount of 9.4 parts by mass and 15.4 parts by mass of EPICOAT YX8000 were mixed, and a cured product having a thickness of 1 mm was obtained in accordance with the same procedures as those conducted in Example 1.

The results of evaluation of the curing agent for epoxy resins and the cured product are shown in Table 5.

Example 4

A curing agent for epoxy resins was prepared in accordance with the same procedures as those conducted in Example 1 except that 90 parts by mass of liquid 1,2,4-cyclohexanetricarboxylic acid 1,2-anhydride obtained in Preparation Example 1 and 10 parts by mass of RIKACID MH700G were used.

The obtained curing agent for epoxy resins in an amount of 9.4 parts by mass and 15.6 parts by mass of EPICOAT YX8000 were mixed, and a cured product having a thickness of 1 mm was obtained in accordance with the same procedures as those conducted in Example 1.

The results of evaluation of the curing agent for epoxy resins and the cured product are shown in Table 5.

Example 5

A curing agent for epoxy resins was prepared in accordance with the same procedures as those conducted in Example 1 except that 95 parts by mass of liquid 1,2,4-cyclohexanetricarboxylic acid 1,2-anhydride obtained in Preparation Example 1 and 5 parts by mass of RIKACID MH700G were used.

The obtained curing agent for epoxy resins in an amount of 9.4 parts by mass and 15.6 parts by mass of EPICOAT YX8000 (the epoxy equivalent: 201) were mixed, and a cured product having a thickness of 1 mm was obtained in accordance with the same procedures as those conducted in Example 1.

The results of evaluation of the curing agent for epoxy resins and the cured product are shown in Table 5.

Example 6

A curing agent for epoxy resins was prepared in accordance with the same procedures as those conducted in Example 1 except that 99 parts by mass of liquid 1,2,4-cyclohexanetricarboxylic acid 1,2-anhydride obtained in Preparation Example 1 and 1 part by mass of RIKACID MH700G were used.

The obtained curing agent for epoxy resins in an amount of 9.3 parts by mass and 15.7 parts by mass of EPICOAT YX8000 were mixed, and a cured product having a thickness of 1 mm was obtained in accordance with the same procedures as those conducted in Example 1.

The results of evaluation of the curing agent for epoxy resins and the cured product are shown in Table 5.

Example 7

A curing agent for epoxy resins was prepared in accordance with the same procedures as those conducted in Example 1 except that RIKACID HH (the main component: hexahydrophthalic anhydride; manufactured by NEW JAPAN CHEMICAL Co., Ltd.) was used in place of RIKACID MH700G.

The obtained curing agent for epoxy resins in an amount of 10.9 parts by mass and 13.4 parts by mass of EPICOAT YX8000 were mixed, and a cured product having a thickness of 1 mm was obtained in accordance with the same procedures as those conducted in Example 1.

The results of evaluation of the curing agent for epoxy resins and the cured product are shown in Table 5.

Example 8

A curing agent for epoxy resins was prepared in accordance with the same procedures as those conducted in Example 1 except that RIKACID HNA-100 (the main component: hydrogenated methylnadic anhydride; manufactured by NEW JAPAN CHEMICAL Co., Ltd.) was used in place of RIKACID MH700G.

The obtained curing agent for epoxy resins in an amount of 13.1 parts by mass and 16.9 parts by mass of EPICOAT YX8000 were mixed, and a cured product having a thickness of 1 mm was obtained in accordance with the same procedures as those conducted in Example 1.

The results of evaluation of the curing agent for epoxy resins and the cured product are shown in Table 6.

Example 9

A cured product having a thickness of 1 mm was obtained in accordance with the same procedures as those conducted in Example 2 except that EPICOAT 828EL (an epoxy resin of the bisphenol A type; the epoxy equivalent: 187; manufactured by JAPAN EPOXY RESIN Co., Ltd.) was used in place of EPICOAT YX8000, and 50.0 parts by mass of the curing agent for epoxy resins was mixed with 41.0 parts by mass of EPICOAT 828EL.

The results of evaluation of the curing agent for epoxy resins and the cured product are shown in Table 6.

Example 10

A cured product having a thickness of 1 mm was obtained in accordance with the same procedures as those conducted in Example 2 except that CELOXIDE 2021P (an epoxy resin having epoxy group at the cyclohexane ring; the epoxy equivalent: 126; manufactured by DAICEL KAGAKU KOGYO Co., Ltd.) was used in place of EPICOAT YX8000, and 18.0 parts by mass of the curing agent for epoxy resins was mixed with 41.0 parts by mass of CELOXIDE 2021P.

The results of evaluation of the curing agent for epoxy resins and the cured product are shown in Table 6.

Comparative Example 1

RIKACID MH700G, a commercial product, in an amount of 11.8 parts by mass and 13.2 parts by mass of EPICOAT YX8000 were mixed, and the curing was attempted by heating the resultant mixture at 120° C. for 2 hours and then at 150° C. for 3 hours in accordance with the same procedures as those conducted in Example 1. The curing did not proceed since no curing accelerator was used. Therefore, evaluation of a cured product was not possible.

The result of the evaluation of the used curing agent for epoxy resins is shown in Table 6.

Comparative Example 2

RIKACID HH, a commercial product, in an amount of 11.1 parts by mass and 13.2 parts by mass of EPICOAT YX8000 were mixed, and the curing was attempted by heating the resultant mixture at 120° C. for 2 hours and then at 150° C. for 3 hours in accordance with the same procedures as those conducted in Example 1. The curing did not proceed since no curing accelerator was used. Therefore, evaluation of a cured product was not possible.

The result of the evaluation of the used curing agent for epoxy resins is shown in Table 6.

Comparative Example 3

Liquid 1,2,4-cyclohexanetricarboxylic acid 1,2-anhydride obtained in Preparation Example 1 alone was used as the curing agent for epoxy resins. The above anhydride in an amount of 11.1 parts by mass and 18.9 parts by mass of EPICOAT YX8000 were mixed, and a cured product having a thickness of 1 mm was obtained in accordance with the same procedures as those conducted in Example 1.

The results of evaluation of the curing agent for epoxy resins and the cured product are shown in Table 6.

TABLE 5

| | | Example | | | | | |
|---|---|---|---|---|---|---|---|
| Comparative Example | 1 | 2 | 3 | 4 | 5 | 6 | 7 |
| Composition of curing agent for epoxy resins (part by mass) | | | | | | | |
| cyclohexanetricarboxylic acid anhydride (A) | | | | | | | |
| 1,2,4-cyclohexanetricarboxylic acid 1,2-anhydride | 20 | 50 | 80 | 90 | 95 | 99 | 80 |
| aliphatic dicarboxylic acid anhydride (B) | | | | | | | |
| RIKACID MH700G | 80 | 50 | 20 | 10 | 5 | 1 | |
| RIKACID HH | | | | | | | |
| RIKACID HNA-100 | | | | | | | 20 |
| Formulation of epoxy resin composition (cured product) (part by mass) | | | | | | | |
| epoxy resin | | | | | | | |
| EPICOAT YX8000 | 11.6 | 41.0 | 15.4 | 15.6 | 15.6 | 15.7 | 13.4 |
| EPICOAT 828EL | | | | | | | |
| CELOXIDE 2021P | | | | | | | |
| above curing agent for epoxy resins | 13.4 | 40.0 | 9.6 | 9.4 | 9.4 | 9.3 | 10.9 |
| ratio of amounts by equivalent | 1.1 | 1.1 | 0.9 | 0.9 | 0.9 | 0.9 | 1.1 |
| Evaluation of curing agent for epoxy resins | | | | | | | |
| viscosity (25° C., Pa · s) | 0.28 | 6.16 | 160 | 170< | 170< | 170< | 0.41 |
| viscosity (50° C., Pa · s) | — | 0.477 | 8.30 | 20.8 | 39.0 | 61.0 | — |
| storage stability | | | | | | | |
| 1 month | good | good | good | good | good | good | good |
| 2 months | good | good | good | good | good | poor | good |
| 3 months | good | good | good | good | poor | poor | good |
| Evaluation of cured epoxy resin | | | | | | | |
| initial light transmittance (C, %) | 68.6 | 69.6 | 81.1 | 81.2 | 81.1 | 81.4 | 67.8 |
| light transmittance after heat treatment (D, %) | 51.2 | 46.7 | 74.7 | 74.9 | 75.0 | 75.0 | 49.9 |
| retention of light transmittance (D/C, %) | 74.7 | 67.2 | 92.1 | 92.2 | 92.5 | 92.1 | 73.8 |

TABLE 6

| | Example | | | Comparative Example | | |
|---|---|---|---|---|---|---|
| | 8 | 9 | 10 | 1 | 2 | 3 |
| Composition of curing agent for epoxy resins (part by mass) cyclohexanetricarboxylic acid anhydride (A) | | | | | | |
| 1,2,4-cyclohexanetricarboxylic acid 1,2-anhydride | 20 | 50 | 50 | | | 100 |
| aliphatic dicarboxylic acid anhydride (B) | | | | | | |
| RIKACID MH700G | | 50 | 50 | 100 | | |
| RIKACID HH | | | | | 100 | |
| RIKACID HNA-100 | 80 | | | | | |
| Formulation of epoxy resin composition (cured product) (part by mass) epoxy resin | | | | | | |
| EPICOAT YX8000 | 16.9 | 41.0 | | 13.2 | 13.2 | 18.9 |
| EPICOAT 828EL | | | | | | |
| CELOXIDE 2021P | | | 41.0 | | | |
| above curing agent for epoxy resins | 13.1 | 50.0 | 18.0 | 11.8 | 11.1 | 11.1 |
| ratio of amounts by equivalent | 0.9 | 1.25 | 0.3 | 1.1 | 1.1 | 0.9 |
| Evaluation of curing agent for epoxy resins | | | | | | |
| viscosity (25° C., Pa·s) | 1.48 | 6.16 | 6.16 | 0.06 | solid | 170< |
| viscosity (50° C., Pa·s) | — | — | — | — | — | 70.6 |
| storage stability | | | | | | |
| 1 month | good | good | good | good | — | poor |
| 2 months | good | good | good | good | — | poor |
| 3 months | good | good | good | good | — | poor |
| Evaluation of cured epoxy resin | | | | not cured | not cured | |
| initial light transmittance (C, %) | 66.1 | 86.6 | 90.2 | — | — | 81.5 |
| light transmittance after heat treatment (D, %) | 47.7 | 82.9 | 89.1 | — | — | 75.1 |
| retention of light transmittance (D/C, %) | 72.1 | 95.8 | 98.8 | — | — | 92.1 |

INDUSTRIAL APPLICABILITY

The curing agent of the present invention can be handled easily since the curing agent is liquid at the ordinary temperature, makes curing of an epoxy resin possible without addition of a curing accelerator and provides a cured product of an epoxy resin exhibiting excellent transmission of light and heat stability. The epoxy resin composition can be advantageously used for coating materials, adhesives, molded products, resins for encapsulating photo-semiconductors and coating fluids for protective films of color filters constituting liquid crystal displays (LCD), solid state imaging devices (CCD) and electroluminescence (EL) devices.

The invention claimed is:

1. A curing agent for epoxy resins which comprises cyclohexanetricarboxylic acid anhydride (A) comprising trans,trans-1,2,4-cyclohexanetricarboxylic acid 1,2-anhydride expressed by formula (1):

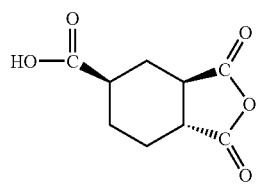

(1)

and aliphatic dicarboxylic acid anhydride (B), wherein a ratio of amounts by mass (A:B) of cyclohexanetricarboxylic acid anhydride (A) to aliphatic dicarboxylic acid anhydride (B) is in a range of 90:10 to 20:80.

2. A curing agent for epoxy resins according to claim 1, which is a mixture of cyclohexanetricarboxylic acid anhydride (A) which comprises trans,trans-1,2,4-cyclohexanetricarboxylic acid 1,2-anhydride expressed by formula (1) and is liquid at an ordinary temperature and aliphatic dicarboxylic acid anhydride (B).

3. A curing agent for epoxy resins according to claim 1, wherein said aliphatic dicarboxylic acid anhydride (B) is an alicyclic dicarboxylic acid anhydride.

4. An epoxy resin composition which comprises a curing agent for epoxy resins described in claim 1 and an epoxy resin.

5. An epoxy resin composition according to claim 4, wherein relative amounts of the epoxy resin and the curing agent for epoxy resins satisfy a condition such that a ratio of amounts by equivalent expressed by the following equation:

$$\text{ratio of amounts by equivalent} = (X/2)/Y$$

wherein X represents a number of an entire carboxyl group in the curing agent for epoxy resins and in the epoxy resin, wherein a number of carboxyl group is set at 2 for one acid anhydride group and a number of carboxyl group is set at 1 for one carboxylic acid group, and wherein Y represents a number of epoxy group in the epoxy resin, is in a range of 0.1 to 3.0.

6. A curing agent for epoxy resin according to claim 1, wherein a content of said trans,trans-1,2,4-cyclohexanetricarboxylic acid 1,2-anhydride expressed by formula (1) in the cyclohexanetricarboxylic acid anhydride is at least 1% by mass.

7. A curing agent for epoxy resin according to claim 6, wherein said content is at least 5% by mass.

8. A curing agent for epoxy resin according to claim 1, wherein a content of said trans, trans-1,2,4-cyclohexanetricarboxylic acid 1,2-anhydride expressed by formula (1) in the cyclohexanetricarboxylic acid anhydride is at least 63.2% by mass.

9. A curing agent for epoxy resin according to claim 1, wherein said aliphatic dicarboxylic acid anhydride (B) is selected from the group consisting of methylhexahydrophthalic anhydride, hexahydrophthalic anhydride, methyltetrahydrophthalic anhydride, and hydrogenated methylnadic anhydride.

10. A curing agent for epoxy resin according to claim 1, wherein said aliphatic dicarboxylic acid anhydride (B) is selected from the group consisting of methylhexahydrophthalic anhydride, hexahydrophthalic anhydride, and hydrogenated methylnadic anhydride.

11. A curing agent for epoxy resin according to claim 10, wherein a content of said trans, trans-1,2,4-cyclohexanetricarboxylic acid 1,2-anhydride expressed by formula (1) in the cyclohexanetricarboxylic acid anhydride is at least 63.2% by mass.

* * * * *